United States Patent [19]

Reed et al.

[11] 4,212,924

[45] Jul. 15, 1980

[54] NOVEL WHITEWARE BODIES AND ENERGY EFFICIENT PROCESS FOR THEIR PRODUCTION

[75] Inventors: James S. Reed; Roger H. Moore, both of Alfred, N.Y.

[73] Assignee: Alfred University Research Foundation, Alfred, N.Y.

[21] Appl. No.: 875,177

[22] Filed: Feb. 6, 1978

[51] Int. Cl.$^2$ .................... B32B 17/06; C03C 9/00
[52] U.S. Cl. .................... 428/428; 106/45; 106/48
[58] Field of Search .............. 106/48, 45; 428/428

[56] References Cited

U.S. PATENT DOCUMENTS

| | | | |
|---|---|---|---|
| 2,486,811 | 11/1949 | Weyl | 106/45 |
| 2,576,916 | 12/1951 | Beals et al. | 106/48 |
| 2,608,490 | 8/1952 | Donahey | 106/48 |

*Primary Examiner*—O. R. Vertiz
*Assistant Examiner*—Mark Bell
*Attorney, Agent, or Firm*—Fred L. Denson

[57] ABSTRACT

Novel ceramic whiteware bodies, glazes and compositions for the bodies and energy efficient processs for the fabrication of the bodies are described.

The whiteware bodies contain a matrix of a low melting alkali phosphate frit having quartz particles dispersed therein as a filler material. Typically, a composition comprising from about 50% by weight to about 80% by weight of particulate quartz filler and from about 20% by weight to about 50% by weight of an alkali phosphate frit is heated to within a temperature range from about the softening temperature of the alkali phosphate frit to about 600° C. Thereafter, the body is fabricated either by sintering the composition within the indicated temperature range for a period of time from about 0.1 hours to about 10 hours or by hot forging the composition within the indicated temperature range.

The novel glaze of the invention comprises an alkali phosphate frit and optionally modifying materials such as opacifiers, pigments and the like. The glazed ceramic whiteware bodies described herein may be used in low temperature applications.

18 Claims, No Drawings

NOVEL WHITEWARE BODIES AND ENERGY EFFICIENT PROCESS FOR THEIR PRODUCTION

BACKGROUND OF THE INVENTION

This invention relates to ceramic whiteware bodies, glazes for the bodies, compositions for preparing the bodies and energy efficient processes for the fabrication of the bodies.

Over the past several years the production of whiteware bodies has increased substantially in the United States. The rapidity of this growth is demonstrated by the fact that total domestic production of fine ceramics increased from an estimated 750 million dollars in 1960 to more than 1.1 billion dollars in 1970. Continuing research and development efforts to improve existing products and find new uses therefore, to develop new products and to improve production efficiencies have immeasurably contributed to the expansion of the whiteware market.

The production of tile, which comprises a substantial portion of the whiteware manufactured domestically, is exemplary of the improvements which have been realized throughout the industry as a result of such research and development endeavors. Commercial tile products are generally classified either as floor tile or wall tile and are used in and about the home in bathrooms, kitchens, terraces and swimming pools. They are also used on floors and walls of public and industrial buildings. While many floor tile bodies are triaxial with a high feldspar content, most wall tile bodies have a high talc content (60% to 80%). The firing schedules for the production of commercial tile bodies usually encompasses temperatures within the range of 1000° C. to 1300° C. and periods of time of several hours duration. In the past, glazes for wall tiles frequently proved to become inadequate with the passage of time due to crazing problems. More recently, however, glazes have been developed which display greatly improved resistance to crazing. Other improvements in tile production relate to appearance, strength and cost.

The preceding discussion has focused upon tile bodies for illustrative purposes only since, as previously mentioned, tile is one of the more common whiteware bodies. Obviously, similar considerations are applicable to the production and utilization of other whiteware bodies. In this regard extensive research and development work has been undertaken to ascertain ways of realizing additional cost savings in the production of whiteware products. One area that has received considerable attention is the relatively large quantities of fuel which are required to meet the firing schedules for fabrication of the multitude of whiteware products. The advent of "the energy crisis" and the concommitant substantial increases in fuel costs have caused a corresponding increase in production costs. Thus, many of the savings previously realized from improved products and manufacturing efficiencies have been partially offset by the added cost of heat. Attempts to conserve energy by producing selected whiteware products by using less intense processing conditions (i.e. altering the firing schedule by using lower temperatures or shorter times.) have been successful only on a very limited basis largely because the fabrication of a particular whiteware product requires a specific firing schedule which inherently includes a unique relationship between specific times and specific temperatures. When an altered firing schedule is employed, oftentimes, the end product does not have the desired properties.

OBJECTS OF THE INVENTION

It is therefore an object of this invention to provide an energy efficient process for the production of whiteware bodies.

It is another object of the invention to provide a novel whiteware body having good strength properties.

Yet another object of the invention is to provide a novel glaze which is durable and suitably fits the whiteware body of the invention.

A further object of the invention is to provide a novel tile having an attractive appearance and good strength properties.

An additional object of the invention is to provide a novel ceramic composition for the fabrication of whiteware bodies.

SUMMARY OF THE INVENTION

These and other objects are accomplished by the fabrication of a novel ceramic whiteware body comprising a matrix of a low melting alkali phosphate frit having quartz particles dispersed therein as a filler material. The invention also includes a novel glaze having a thermal expansion coefficient which is compatible with the whiteware body of the invention. The novel process for making whiteware bodies described herein is designed to provide commercially acceptable products at reduced costs. Cost savings are realized from the energy efficient firing schedules used in the fabrication process. These firing schedules generally employ relatively low temperatures for relatively short periods of time. Typically, a composition comprising from about 50% by weight to about 80% by weight of particulate quartz filler and from about 20% by weight to about 50% by weight of an alkali phosphate frit is heated to within a temperature range from about the softening temperature of the alkali phosphate frit to about 600° C. Thereafter, the body is fabricated either by sintering the composition within the indicated temperature range for a period of time from about 0.1 hours to about 10 hours or by hot forging the composition within the indicated temperature range.

The novel glaze of the invention comprises an alkali phosphate frit and optionally modifying materials such as opacifiers, pigments and the like. When such modifying materials are used, the glaze contains at least 70% by weight, and preferably at least 90% by weight, of the alkali phosphate frit. The novel glaze provides a suitable fit with the ceramic whiteware body of the invention. The glazed ceramic whiteware bodies described herein may be used in low temperature applications. They are particularly suitable for usage as decorative tile and wall tile because of their attractive appearance and also because their strength is more than double that of commercial bathroom tile. Moreover, the energy efficient process described herein permits such tiles to be more economically produced than commercially available wall tile.

DETAILED DESCRIPTION OF THE INVENTION

Alkali Phosphate Frit

Any alkali phosphate glass composition having a softening point at or below the quartz inversion temperature is a suitable frit material for use in the compositions of the invention. Because the softening point is lower than the quartz inversion temperature, the frit, upon heating, provides a viscous liquid matrix which surrounds the quartz particles, and upon cooling, binds them together. When used in this manner and compared to other frit materials, the final whiteware product containing the alkali phosphate frit described herein exhibit an improved bulk density, absolute and apparent porosity, densification and bend strength. While any one of several materials containing substantial amounts of phosphorus pentoxide, lithium oxide, sodium oxide and/or potassium oxide can be used as the frit in the practice of the invention, a particularly suitable alkali phosphate frit is Pemco No. P-2J57 (Pemco Div. of SCM Corp., Baltimore, Md.). The composition and properties of this material are set forth in Table I.

Particulate Quartz Filler

Any type of essentially pure particulate quartz such as potter's flint (typical composition set forth in Table I) or ground glass sand may be used in preparing the compositions of the invention. Silica in the form of quartz is one of the most plentiful natural minerals and thus is available from a number of suppliers. Particulate quartz is desirable as the filler material because of its good strength properties and low cost. Particle packing, strength and related properties of the final whiteware product are significantly improved by controlling the particle size distribution of the quartz filler. The desired quartz particle size distribution is obtained by using a mixture of coarse quartz and regular quartz. The term "regular quartz" as used herein refers to particulate quartz wherein at least 50% of the particles have a maximum dimension of 75$\mu$ or more and no more than 40% of the particles have a maximum dimension of less than 75$\mu$. The term "coarse quartz" as used herein refers to particulate quartz having a maximum dimension of 100$\mu$ or more wherein at least 50% of the particles have a maximum dimension greater than 149$\mu$. Improved properties result when the ceramic composition contains 10% by weight to 25% by weight of coarse quartz particles mixed with regular quartz particles. Supersil potter's flint (by Pennsylvania Glass Sand, Inc.) may suitably be used as the particulate regular quartz. A suitable particulate coarse quartz is obtained by sieving out particle sizes of 100$\mu$ or more from the Supersil potter's flint.

TABLE I

| Properties and Composition | Alkali Phosphate Frit | Quartz Filler (Potter's Flint) |
|---|---|---|
| Softening Temperature | 520° C. | 1728° C. (Melting) Point) |
| Coeff. of Lin. Therm. Exp. | 210 × 10$^{-7}$/° C. | 138 × 10$^{-7}$/° C. |
| Density | 2.645 g/cc | 2.651 g/cc |
| Inversion Temp. | — | 573° C. |
| Oxide Composition | Wt % | Wt % |
| $P_2O_5$ | 41.0 | — |
| $Na_2O$ | 21.3 | — |
| $Al_2O_3$ | 19.2 | 0.17 |
| $B_2O_3$ | 6.6 | — |
| $Li_2O$ | 3.6 | — |
| F | 7.2 | — |
| $SiO_2$ | 1.2 | 99.80 |
| $Fe_2O_3$ | — | 0.02 |

COMPOSITION AND PROCESS

The composition from which the whiteware body is fabricated preferably contains from about 60% by weight to about 75% by weight of the particulate quartz filler and from about 25% by weight to about 40% by weight of alkali phosphate frit. A particularly suitable composition contains 70% by weight of quartz filler and 30% by weight of alkali phosphate frit. As previously noted, further improvements in the packing density and their properties are achieved when the quartz component is comprised of a mixture of course quartz and regular quartz to provide the desired particle size distribution. Thus, the particulate course quartz component may comprise 10% by weight to 25% by weight and preferably 20% by weight of the total composition, the balance of the composition comprising the alkali phosphate frit and particulate regular quartz.

While the whiteware bodies of this invention can be fabricated by an conventional means, the two preferred methods are liquid phase sintering and hot forging. When sintering is utilized for densification, the composition is dry mixed, pressed and fired to within a preferred temperature range of from about the softening temperature of the alkali phosphate frit (approximately 520° C.) to the inversion temperature of the quartz (573° C.), for a preferred period of time from about 0.25 hours to about 2.25 hours. Particularly good results are attained by firing at a temperature of 570° C. for 0.5 hours.

It is preferred to fabricate the whiteware bodies of this invention at temperatures slightly below 573° C., the temperature at which quartz inverts from the $\alpha$ or lower form to the $\beta$ or higher form. The inversion is caused by the buildup of sufficient thermal energy to overcome the barrier of low-temperature bonding thereby permitting the silicon-oxygen tetrahedral group to rotate with respect to each other. Since the beneficial results of the invention are obtainable without inverting quartz to its $\beta$ form, it is unnecessary to supply the additional energy required for the inversion. When the quartz inversion temperature is exceeded in the practice of this invention, the $\beta$ form of quartz exhibits different physical properties (e.g. density) than the $\alpha$ form. However, this change in properties is reversible on cooling the composition so that there is no detrimental effect on the final properties of the fabricated whiteware body when the inversion temperature is exceeded.

When the composition is sintered, the lower melting alkali phosphate frit forms the liquid phase which surrounds the quartz particles and bonds them together. Upon cooling, the frit is similar to a vitreous matrix having quartz particles dispersed therein.

The second method of fabrication, hot forging, involves densification and deformation of the composition under an applied load within the aforementioned temperature ranges. The bodies produced by either method of fabrication display acceptable bend strengths, moduli of rupture, absolute and apparent porosities and bulk densities. Hot forging is advantageous in that it enhances grain boundary sliding and rearrangement which is one of the mechanisms that determines densification. Thus, hot forging usually provides bodies having even greater densities and strengths and lower absolute and apparent porosities than those produced by sintering.

THE GLAZE

The novel glaze described herein is also an integral part of the invention since it gives the whiteware body a good appearance, provides a glassy coat which is impervious to chemical attack and increases mechanical strength. An important consideration in the preparation of the glaze is the correctness of the fit as determined from the relative-thermal expansion coefficients of the body and the glaze. When the thermal expansion coefficient of the glaze is greater than that of the body, the glaze coat is put in tension and crazing on the glaze occurs. Besides being aesthetically unpleasing, crazing has a tendency to reduce the strength of the body by the network of cracks on the surface. When the thermal expansion coefficient of the body is greater than that of the glaze, compression of the glaze results. When this difference is too great, the compressive forces result in peeling of the glaze. However, when a difference of approximately 20% or less exists, the glaze has a good fit with the body and improved physical properties are realized.

The glazes of the invention are also prepared from an alkali phosphate frit. When a Pemco P-2J57 frit is used, its expansion coefficient is, as previously indicated in Table I, $210 \times 10^{-7}/°$ C. Through dilatometric analysis, it has been ascertained that this coefficient is too high to provide a suitable fit for the whiteware bodies described herein. Thus, in a preferred embodiment, a modifying material is added to the glaze to reduce its thermal expansion coefficient to a level which is compatible with that of the body. Typically, a suitable coefficient for the glaze can be achieved by the addition of 10% by weight of Superpax ($ZrO_2 . SiO_2$ provided by TAM Division, NL Industries, Niagara Falls, New York) to the glaze composition. Additional modifying materials such as pigments and opacifiers may be added to provide color and/or opacity to the glaze coat. Typical opacifiers include titanium dioxide, zirconium dioxide, antimony oxide, zinc oxide, and tin oxide. Where such modifying materials are employed, they comprise less than 30% by weight, and preferably less than 10% by weight of the glaze composition.

The glaze is applied to the body in a thin layer by any one of several known techniques such as spraying, dipping or brushing and is thereafter matured by firing in the conventional manner.

EXAMPLES

The following illustrative examples are set forth to provide a clearer understanding of the invention and are not to be construed as limiting the principles which underly the spirit and scope of the invention.

EXAMPLE 1

2.8 grams of an alkali phosphate frit (Pemco No. P2J57) are dry mixed with 1.4 grams of particulate course quartz and 2.8 grams of a particulate regular quartz. The composition is dry pressed at 2400 psi in the presence of 5% of a 2% aqueous Methocell solution as a binder to form a disk which is 3.5 cm in diameter and 0.4 cm thick. The disk is sintered in an electric oven type furnace at a temperature of 570° C. for 0.25 hours. After the body is cooled, the apparent porosity, absolute porosity, bulk density and percent density are determined. These results are set forth in Table II.

EXAMPLES 2-4

Three additional disks are prepared in the manner described in Example 1. The disks are fired at 570° C. for 0.5 hours, 1.0 hour and 2.25 hours. Determinations of the apparent porosities, absolute porosities, bulk densities and percent densities are set forth in Table II.

TABLE II

| Example No. | Soak Time (Hours) | Apparent Porosity | Absolute Porosity | Bulk Density | Percent Density |
| --- | --- | --- | --- | --- | --- |
| 1 | 0.25 | 7.9% | 25.0% | 1.98g/cc | 75.0% |
| 2 | 0.5 | 1.3% | 24.3% | 2.00g/cc | 75.7% |
| 3 | 1.0 | 0.04% | 26.8% | 1.94g/cc | 73.2% |
| 4 | 2.25 | 0.04% | 31.2% | 1.85g/cc | 68.8% |

EXAMPLE 5

Two coats of glaze composition comprising an aqueous suspension containing 10.0 grams of alkali phosphate frit are applied by brush to the surface of the whiteware body of Example 2. The glazed piece is fired to 570° C. and soaked to two minutes. The thermal expansion coefficients of the glaze and body as measured by an Orton Dilatometer are $210 \times 10^{-7}/°$ C. and $192 \times 10^{-7}/°$ C. respectively indicating that the glaze is in tension.

EXAMPLE 6

Example 5 is repeated except the glaze composition is an aqueous suspension containing 9.0 grams of alkali phosphate frit and 1.0 grams of a material to modify the thermal expansion coefficient, Superpax, $ZrO_2 . SiO_2$. The thermal expansion coefficient of the glaze is the same as the body, $192 \times 10^{-7}/°$ C.

EXAMPLE 7

Example 5 is repeated except the glaze composition is an aqueous suspension containing 8.8 grams of alkali phosphate frit, 1.0 grams of Superpax, $ZrO_2 . SiO_2$ and 0.2 grams of brown pigment. The thermal expansion coefficient of the glaze is $164 \times 10^{-7}/°$ C. while the coefficient of the body is $192 \times 10^{-7}/20$ C. indicating that the glaze is in compression. The specimen shows no deterioration when subjected to the autoclave test for crazing resistance of fired glazed whiteware (ASTM No. C424).

EXAMPLE 8

2.8 grams of an alkali phosphate frit (Pemco No. P-2J57) are dry mixed with 2.8 grams of particulate regular quartz and 1.4 grams of particulate course quartz. The composition is dry pressed at 2400 psi in the presence of 5% of a 2% aqueous Methocel solution as a binder to form a disk which is 2.54 cm in diameter and 0.84 cm thick. The disk is hot forged at 570° C. between two yttria stabilized zirconia disks attached to the ends of the stainless steel plungers of the forge to minimize the adherence of the disk to the plungers. This disk is forged to a diameter of 2.865 cm and a thickness of 0.35 cm. The resultant density, percent density, apparent porosity, absolute porosity and modules of rupture of the disk are set forth in Table III.

EXAMPLE 9

Example 8 is repeated except the composition which is dry pressed contains 2.1 grams of alkali phosphate frit, 3.5 grams of particulate regular quartz and 1.4 grams of particulate course quartz. The properties of the forged disk are set forth in Table III.

EXAMPLE 10

Example 8 is repeated except the composition which is dry pressed contains 1.4 grams of alkali phosphate frit, 4.2 grams of particulate regular quartz and 1.4 grams of particulate course quartz. The properties of the forged disk are set forth in Table III.

EXAMPLE 11

The modulus of rupture of the sintered body of Example No. 2 is measured for comparison purposes with a similar disk which has been fabricated by hot forging (Example No. 8). As shown in Table III, the sintered disk has a modulus of rupture of 5261 psi whereas the hot forged disk has a modulus of rupture of 9649 psi.

EXAMPLE 12

The modulus of rupture of the glazed sintered body of Example No. 7 is measured for comparison purposes with similar disks fabricated by hot forging (Example No. 8) and sintering without glaze (Example No. 1 and No. 11). As shown in Table III, the glazed sintered disk has a modulus of rupture of 6908 psi whereas, the moduli of rupture of the hot forged and unglazed sintered disks are 9,649 psi and 5,261 psi respectively.

TABLE III

| Ex. No. | % Frit | Fabrication Method | Density g/cc | % Density | Abs Porosity | App Porosity | MOR (PSI) |
|---|---|---|---|---|---|---|---|
| 8 | 40 | Hot Forge | 2.32 | 87.9 | 12.1% | 0.76% | 9,649 |
| 9 | 30 | Hot Forge | 2.19 | 82.8 | 17.2 | 5.63 | 11,556 |
| 10 | 20 | Hot Forge | 1.86 | 70.3 | 29.7 | 16.48 | 9,777 |
| 11 | 40 | Sinter *(See Ex. No. 2) | 2.00 | 75.7 | 24.3 | 1.3 | 5,261 |
| 12 | 40 | Sinter With Glaze *(See Ex. No. 7) | — | — | — | — | 6,908 |

EXAMPLE 13

Six specimens are prepared in accordance with Example 7 except blue, green, yellow, lavender, gray and white pigments are used instead of the brown pigment. In each case, the specimens exhibit favorable properties which are similar to the properties of the specimens of Example 7 including suitable fits between the glazes and their respective bodies.

EXAMPLE 14

Two coats of a glaze composition comprising an aqueous suspension containing 8.8 grams of alkali phosphate frit, 1.0 grams of Superpax $ZrO_2 \cdot SiO_2$ and 0.2 grams of brown pigment are applied by brush to the surface of the hot forged whiteware body of Example 9. The glazed piece is fired to 570° C. and soaked for two minutes. The thermal expansion coefficient of the glaze is $164 \times 10^{-7}/°$ C. while the coefficient of the body is $192 \times 10^{-7}/°$ C. indicating that the glaze is in compression. The specimen shows no deterioration when subjected to the autoclave test for crazing resistance of fired glazed whiteware (ASTM No. C424).

EXAMPLE 15

Two glazed tile bodies are prepared in accordance with Example No. 14 and Example No. 7 and their flexural strengths compared to commercial wall tile A and commercial wall tile B. The flexural strength of commercial tile A is 2,972 psi and that of commercial tile B is 3,452 psi. The flexural strengths of the glazed tile bodies prepared according to Examples 7 and 14 are more than double that of commercial wall tile A and commercial wall tile B. Moreover, the glazed tile bodies prepared according to Examples 7 and 14 satisfactorily pass the autoclave test for wall tiles.

EXAMPLES 16 and 17

These examples show the effect of the particle size distribution of the quartz component on various properties of the whiteware bodies of this invention. Example 2 is repeated except the weight percentage of regular quartz and course quartz used in the composition of the whiteware body is varied and the corresponding properties determined as indicated in the following Table IV.

TABLE IV

| Example No. | Percent By Weight | | | Abs Porosity | App Porosity | Bulk Density | % Dense | Modulus of Rupture |
|---|---|---|---|---|---|---|---|---|
| | Frit | Reg. Quartz | Course Quartz | | | | | |
| 2 | 40 | 40 | 20 | 1.3 | 24.3 | 2.00 | 75.7 | 5,261 |
| 16 | 40 | 50 | 10 | 0.55 | 27.5 | 1.95 | 72.5 | — |
| 17 | 40 | 60 | 0 | 0.07 | 29.2 | 1.85 | 70.8 | — |

The whiteware bodies of Examples 16 and 17 are fabricated by sintering. Similar results are obtained from varying the weight percentage of regular quartz when the whiteware bodies are fabricated by hot forging techniques. A further comparison of the bodies hot forged in Examples 8, 9 and 10 is set forth in Table V to show the effect of particle size distribution on the flexural strength of each of these bodies:

TABLE V

| Example No. | Percent By Weight | | | Modulus of Rupture (PSI) |
|---|---|---|---|---|
| | Frit | Reg. Quartz | Course Quartz | |
| 8 | 40 | 40 | 20 | 9,649 |
| 9 | 30 | 50 | 20 | 11,556 |
| 10 | 20 | 60 | 20 | 9,777 |

USES AND ADVANTAGES OF THE INVENTION

The products of the invention are useful for most low temperature applications such as decorative tile, wall tile, inexpensive dinnerware and the like. Tiles produced according to the invention display more than double the strength of commercial bathroom tiles and are aesthetically attractive. Yet the relatively short times and low temperatures required for their fabrication provide the additional advantage of energy conservation and cost savings resulting therefrom.

Sintered whiteware bodies prepared in accordance with the invention exhibit acceptable absolute porosities, bulk densities and improved strength properties compared to commercially available whiteware products. Their apparent porosities are particularly acceptable in that they are generally less than 3%. Products fabricated by hot forging exhibit even greater improvements in properties over prior art products. Moreover, they are less expensive than the corresponding sintered products since improved properties are realized with up to a 25% reduction in the amount of frit which is utilized. The flexural strengths of the forged bodies are usually greater than 8,500 psi.

The novel glazes described herein provide a suitable fit with the whiteware bodies of the invention and further enhance the strength of the bodies when applied thereto. The glazed bodies respond favorably when subjected to the autoclave test. The foregoing examples illustrate additional improvements and advantages which result from the utilization of the novel compositions and processes of this invention.

The invention has been described in detail with particular reference to preferred embodiments thereof, but it is understood that variations and modifications can be effected within the spirit and scope of the invention.

We claim:

1. A ceramic composition consisting essentially of from about 50% by weight to about 80% by weight of particulate quartz and from about 20% by weight to about 50% by weight of an alkali phosphate frit, said alkali phosphate frit having a softening point below the quartz inversion temperature of 573° C.

2. The ceramic composition of claim 1 having from about 60% by weight to about 75% by weight of particulate quartz and from about 25% by weight to about 40% by weight of alkali phosphate frit.

3. The ceramic composition of claim 1 having 70% by weight of particulate quartz and 30% by weight of alkali phosphate frit.

4. A process for preparing a ceramic whiteware body comprising:
   (a) heating a composition consisting essentially of from about 50% by weight to about 80% by weight of particulate quartz filler and from about 20% by weight to about 50% by weight of an alkali phosphate frit to a temperature ranging from about the softening temperature of the alkali phosphate frit to about 600° C., said alkali phosphate frit having a softening point below the quartz inversion temperature of 573° C., and
   (b) fabricating the heated composition within said temperature range by sintering or hot forging to form the ceramic whiteware body.

5. The process of claim 4 wherein the composition is heated to a temperature ranging from about the softening temperature of the alkali phosphate frit to about the quartz inversion temperature.

6. The process of claim 4 wherein the composition is heated to 570° C.

7. The process of claim 4 wherein the ceramic whiteware body is fabricated by sintering within said temperature range for a period from about 0.1 hours to 10.0 hours.

8. The process of claim 4 wherein the ceramic whiteware body is fabricated by sintering within said temperature range for a period from about 0.25 hours to 2.25 hours.

9. The process of claim 4 wherein the ceramic whiteware body is fabricated by sintering within said temperature range for about 0.5 hours.

10. The process of claim 4 wherein the ceramic whiteware body is fabricated by hot forging within said temperature range.

11. A ceramic whiteware body consisting essentially of from about 20% by weight to about 50% by weight of a matrix of an alkali phosphate frit, said alkali phosphate frit having a softening point below the quartz inversion temperature of 573° C., and from about 50% by weight to about 80% by weight of a particulate quartz filler dispersed in said matrix.

12. The ceramic whiteware body of claim 11 having from about 25% by weight to about 40% by weight of alkali phosphate frit and from about 60% by weight to about 75% by weight of particulate quartz.

13. The ceramic whiteware body of claim 11 having 30% by weight of alkali phosphate frit and 70% by weight of particulate quartz.

14. A ceramic tile having:
   (a) a body consisting essentially of from about 20% by weight to about 50% by weight of a matrix of an alkali phosphate frit, said alkali phosphate frit having a softening point below the quartz inversion temperature of 573° C., and from about 50% by weight to about 80% by weight of a particulate quartz filler dispersed in said matrix, and
   (b) a glaze on the body of the ceramic tile comprising an alkali phosphate frit and at least one modifying material selected from the group consisting of opacifiers and pigments.

15. A glazed ceramic whiteware body having a glaze composition on a ceramic whiteware body, said body consisting essentially of from about 20% by weight to about 50% by weight of a matrix of an alkali phosphate frit, said alkali phosphate frit having a softening point below the quartz inversion temperature of 573° C., and from about 50% by weight to about 80% by weight of a particulate quartz filler dispersed in said matrix, and said glaze composition comprising an alkali phosphate frit and a sufficient amount of a modifying material to make the thermal expansion coefficient of the glaze compatible with the thermal expansion coefficient of the whiteware body.

16. The ceramic whiteware body of claim 15 wherein the glaze composition contains at least 70% by weight of the alkali phosphate frit.

17. The ceramic whiteware body of claim 15 wherein the glaze composition contains at least 90% by weight of the alkali phosphate frit.

18. The ceramic whiteware body of the claim 15 wherein the modifying material is $ZrO_2 \cdot SiO_2$.

* * * * *